Aug. 6, 1957   H. HORTNAGL   2,801,665
APPARATUS FOR COMMINUTING MEAT AND VEGETABLES
Filed Sept. 28, 1956
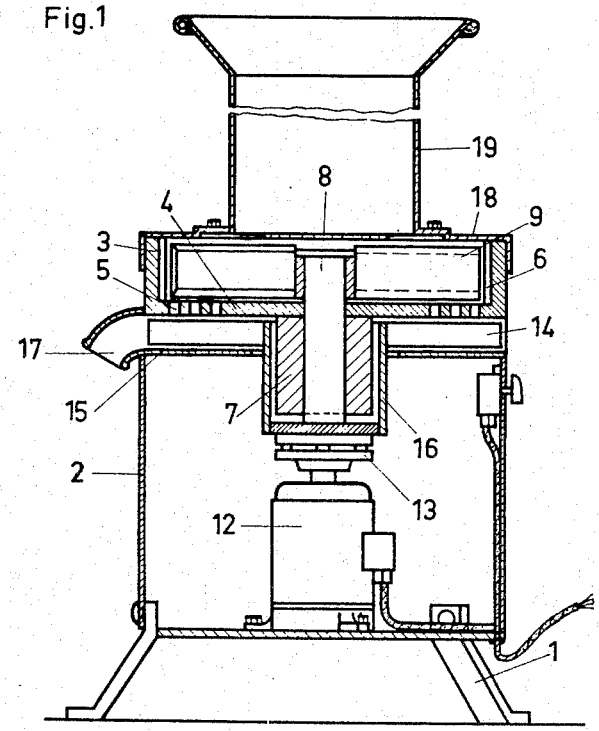
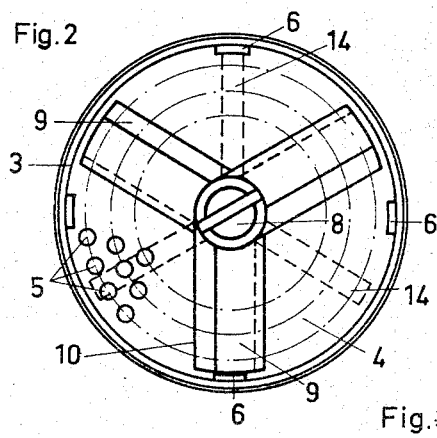
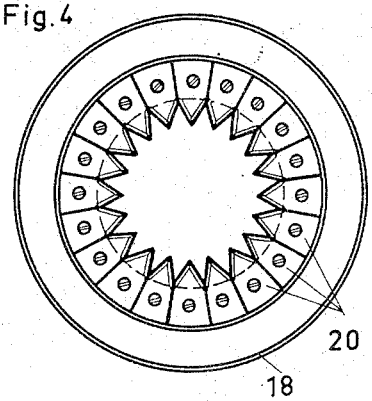
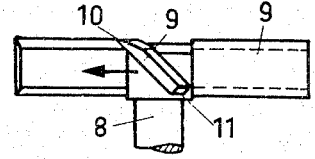
INVENTOR:
HANS HORTNAGL United States Patent Office 2,801,665
Patented Aug. 6, 1957

2,801,665

APPARATUS FOR COMMINUTING MEAT AND VEGETABLES

Hans Hortnagl, Fulpmes, Tirol, Austria, assignor to Robert Friess K. G., Malmsheim b. Stuttgart, Germany, a corporation Application September 28, 1956, Serial No. 612,739

3 Claims. (Cl. 146—192)

The present invention relates to apparatus for cutting up or chopping alimentary products, animal foodstuffs and the like, in which a cutting blade spider comprising two or more cutting blades and driven by a suitable power source, rotates within a housing and over a perforated plate.

In agricultural applications, the apparatus is employed for example for cutting up and processing animal foodstuffs such as green crop, or turnips, potatoes or other fodder, whilst in the meat processing industry it may be used for the mincing or grinding of meat.

Apparatus for cutting-up, chopping, mincing, or grinding of all kinds of material are known in a wide variety of different forms. One of these known constructions comprises, for example, a driven shaft which extends vertically or obliquely into a receptacle and carries a star or spider of radially and outwardly projecting cutting blades which cut up the material. The bottom of the receptacle in which the cutting blade spider operates, is formed as a sieve. It is further known to provide a perforated disc or plate which forms the bottom of a receptacle with holes having bent-up sharpened edges, in the manner of a rasp or grater, so that these bent-up edges act as cutting edges for cutting up the material resting on said perforated plate, and the paste thus produced flows off downwardly through the holes or perforations of the rotating plate.

In another known type of cutting or chopping apparatus a plurality of saw-tooth shaped cutting heads rotate in the lower part of a receptacle, the cutting blades of said cutting heads being directed towards the charging opening of the receptacle.

Further to be mentioned are the well-known meat grinders in which a cutting spider slides on a perforated plate with the cutting edges of the cutting blades which are directed against the direction of motion, whilst a feed screw or worm presses the material to be cut up through the perforated plate, whereby said material is cut up by the cutting blades.

The present invention relates to apparatus for cutting-up or chopping alimentary products, animal foodstuffs and the like, comprising a cutting blade spider with two or more cutting blades rotating within a housing and over a perforated plate, said cutting blades being fixed on a shaft driven directly or indirectly by a motor through toothed or belt gearing, and each of said cutting blades being provided on its upper edge with a cutting edge for pre-cutting the material, and said cutting blades being forwardly inclined with respect to said perforated plate in the direction of motion in order to press the material to be cut up through said perforated plate. The cutting blades are sharpened at their lower edge with which they slide on the plane perforated plate which is provided with sharp-edged holes. Arranged below the perforated plate is a receptacle having a preferably peripherally arranged outlet orifice for the cut-up material which has been pressed through the perforated plate. Rotatably arranged in said receptacle are one or more expeller vanes mounted on the cutting blade shaft and having a height slightly less than the inside height of the receptacle. Above the cutting blade housing is situated a charging hopper, forming a funnel with a cylindrical collecting vessel, the outlet opening of which in the zone of connection with the cutter housing presents a diameter smaller than that of the cutter housing; the diameter of the outlet opening is preferably half of the diameter of the cutter housing, which practical tests have shown to be of special advantage. It is further of advantage to provide at the upper opening of the cutter housing a ring with radially and inwardly projecting teeth having cutting edges, or with like cutting blades, which co-operate with the upper cutting edges of the rotating cutting blades and effect a still further cutting-up of the material. It has been found that by providing such a crown of cutting blades, the cutting efficiency can be improved and the power required for driving the apparatus can be substantially reduced. The cutting blade crown consists, for example, of individual pointed cutting blades having cutting edges on both sides, which are mounted on the inner side of the cutting housing with their points directed towards the center of said housing. According to the invention, sharp-edged axially extending ledges or like projections are provided on the inner peripheral wall of the cutter blade housing, said ledges co-operating with the front faces, resectively with the corresponding edges of the rotating cutting blades and also effecting a still further cutting-up of the pre-cut material.

The invention will now be described in more detail in connection with specific embodiments given by way of example only, and with reference to the accompanying drawings in which:

Fig. 1 is a vertical sectional view of an apparatus according to the invention,

Fig. 2 is a plan view of the apparatus with the cover of the cutter blade housing removed, Fig. 3 shows the cutter blade spider in elevation, and Fig. 4 is a plan view of the underside of the cutter blade housing cover with a ring of cutting blades arranged around the opening.

Referring now more particularly to the drawing there is disclosed a base of an apparatus, which for example may consist of a cylindrical housing 2, resting on feet 1 and carrying the pot-shaped housing 3 the bottom 4 of which is provided with sharp-edged holes 5 adjacent its outer periphery, and the inner wall of which is provided with sharp-edged ledges 6. Secured to the bottom 4 of the cutter blade housing 3 is a bearing member 7 which serves as a support for the vertical drive shaft 8 on the upper end of which is secured a cutting blade spider with three cutting blades 9. The cutting blades 9 are forwardly inclined in the direction of motion and present a sharp upper cutting edge 10, as well as a sharpened lower edge 11 with which the blades slide on the upper surface of the perforated plate 4. The drive shaft 8 of the rotating cutter blades 9 may either be directly coupled with an electric motor 12 through the intermediary of elastic coupling means 13 known per se, or it may be coupled with a prime mover through the intermediary of any suitable gearing means. Toothed gearing as well as belt gearing may be employed. Below the pot-shaped housing 3 in which the cutting blades 9 rotate, there is arranged a receiving and collecting receptacle 15 for the cut material which has been pressed through the holes 5 and which is then fed to the outside of housing 15, through outlet 17, by means of expeller vanes 14 which are connected with the drive shaft 8 by means of a sleeve 16 and are adapted to rotate in the housing 15.

On its upper side, the cutter blade housing 3 is closed by a cover 18 to which is secured the central charging hopper 19. The material introduced into the charging hopper 19 falls downwardly therein and reaches the rotating cutter blades which pre-cut or rough-chop this material with their upper cutting edges 10. The pre-cut material is then forced outwardly under the influence of the inclined cutting blades and of centrifugal force, whereupon it is pressed, by the cutting blades, through the sharp-edged holes 5 provided in the bottom plate 4, whereby fine-cutting or chopping is effected.

Further cutting-up is effected during pre-cutting, when a ring of successive pointed cutting blades or teeth 20 having lateral cutting edges, with their points directed towards the center, is provided around the charging aperture in the cutter blade housing cover 18.

It has been found that the apparatus according to the invention is very suitable for cutting-up or chopping any kind of material in one single operation, including tough and fibrous materials, and it has also been found that the resulting product is very finely cut or chopped, which is especially due to the cutting effect of a plurality of subsequent cutting edges.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In an apparatus for cutting alimentary products, foodstuffs and in particular, meat material; in combination a housing, a receptacle connected to and located below said housing, a hopper located on top of said housing, said hopper being in communication via said housing with said receptacle, a drive shaft extending in substantially vertical direction through said receptacle into said housing, cutting blade means provided with upper and lower cutting portions and mounted on said shaft within said housing, expeller vane means within said receptacle and mounted on said drive shaft for rotation therewith, said receptacle being provided with an outlet, first means spaced from said shaft and forming flat, inwardly extending successive pointed teeth having lateral cutting edges placed adjacent each other and oriented in a substantially horizontal plane, said first means being positioned directly adjacent said upper cutting portion of said blade means, whereby foodstuffs delivered from said hopper into said housing will be pre-cut at said first means, and second means provided with sharp-edged holes located adjacent the lower cutting portion of said cutting blade means and establishing communication between said housing and said receptacle, the lower cutting portion of said blade means overlying said sharp-edged holes of said second means for cooperation therewith, to thereby finely cut said pre-cut foodstuffs and move same through said sharp-edged holes of said second means into said receptacle for discharge of said foodstuffs by said expeller vane means through said outlet.

2. In an apparatus according to claim 1, said first means being a ring provided with a central opening located above said shaft and near the lowermost end of said hopper, the points of said cutting teeth being located along a circle having its center coinciding with the axis of said shaft.

3. In an apparatus according to claim 2, said second means being in the form of a plate located above said receptacle.

References Cited in the file of this patent

UNITED STATES PATENTS

| 820,990 | Sander | May 22, 1906 |
| 2,594,250 | Tranbarger | Apr. 22, 1952 |

FOREIGN PATENTS

| 67,917 | Germany | Apr. 12, 1893 |